United States Patent
Miura et al.

(10) Patent No.: US 9,074,772 B2
(45) Date of Patent: Jul. 7, 2015

(54) COMBUSTOR AND OPERATING METHOD THEREOF

(75) Inventors: Keisuke Miura, Mito (JP); Satoshi Dodo, Kasama (JP); Kazuki Abe, Hitachi (JP); Tomomi Koganezawa, Naka-gun (JP)

(73) Assignee: Mitsubishi Hitachi Power Systems, Ltd., Kanagawa (JP)

( * ) Notice: Subject to any disclaimer, the term of this patent is extended or adjusted under 35 U.S.C. 154(b) by 1261 days.

(21) Appl. No.: 12/893,879

(22) Filed: Sep. 29, 2010

(65) Prior Publication Data
US 2011/0076628 A1 Mar. 31, 2011

(30) Foreign Application Priority Data

Sep. 30, 2009 (JP) ................. 2009-225885

(51) Int. Cl.
| F23N 1/02 | (2006.01) |
| F23R 3/10 | (2006.01) |
| F23R 3/28 | (2006.01) |
| F23R 3/34 | (2006.01) |
| F02C 1/00 | (2006.01) |

(52) U.S. Cl.
CPC . *F23R 3/10* (2013.01); *F23R 3/286* (2013.01); *F23R 3/343* (2013.01); *Y02T 50/675* (2013.01)

(58) Field of Classification Search
CPC ........................................ F23R 3/28
USPC ........... 431/8, 9, 10, 12, 151, 173, 188, 326, 431/328, 352, 354; 126/91 A; 60/134, 776, 60/772, 737
See application file for complete search history.

(56) References Cited

U.S. PATENT DOCUMENTS

| 5,417,566 A | * | 5/1995 | Ishikawa et al. ............... 431/328 |
| 6,813,889 B2 | * | 11/2004 | Inoue et al. ..................... 60/737 |
| 6,912,854 B2 | * | 7/2005 | Inoue et al. ..................... 60/737 |
| 7,188,476 B2 | * | 3/2007 | Inoue et al. ..................... 60/737 |
| 7,200,998 B2 | * | 4/2007 | Inoue et al. ..................... 60/776 |
| 8,006,499 B2 | * | 8/2011 | Koganezawa et al. .......... 60/775 |
| 8,104,284 B2 | * | 1/2012 | Miura et al. ..................... 60/746 |

(Continued)

FOREIGN PATENT DOCUMENTS

| JP | 2003-148734 A | 5/2003 |
| JP | 2005-106305 | 4/2005 |

(Continued)

OTHER PUBLICATIONS

Keisuke Miura et al., "Development of Elemental Technologies of Gas Turbine Combustor for LNG", No. 37, Gas Turbine Periodic Lecture Meeting Papers, Oct. 2009, pp. 1-6 with English translation.

(Continued)

*Primary Examiner* — Steven B McAllister
*Assistant Examiner* — Desmond C Peyton
(74) *Attorney, Agent, or Firm* — Crowell & Moring LLP

(57) ABSTRACT

This invention is directed to supply a combustor having a structure that reduces NOx emissions while maintaining combustion stability. The combustor has a chamber into which fuel and air are supplied. An air hole plate having a plurality of air holes upstream of the chamber is also disclosed, and fuel nozzles supplying fuel to the air holes of the air hole plate are further disclosed. In the combustor, a center of a chamber-side of the air hole plate is closer to the chamber than exits of outermost peripheral air holes.

19 Claims, 15 Drawing Sheets

(56) References Cited

U.S. PATENT DOCUMENTS

| | | | |
|---|---|---|---|
| 8,127,549 B2* | 3/2012 | Miura et al. | 60/737 |
| 8,209,986 B2* | 7/2012 | Lacy et al. | 60/737 |
| 2004/0011054 A1 | 1/2004 | Inoue et al. | |
| 2004/0045297 A1* | 3/2004 | Inoue et al. | 60/740 |
| 2004/0255589 A1* | 12/2004 | Yoshida et al. | 60/746 |
| 2005/0210880 A1* | 9/2005 | Inoue et al. | 60/776 |
| 2006/0016199 A1* | 1/2006 | Inoue et al. | 60/776 |
| 2008/0096146 A1* | 4/2008 | Li et al. | 431/9 |
| 2008/0229755 A1* | 9/2008 | Koganezawa et al. | 60/775 |
| 2008/0268387 A1 | 10/2008 | Saito et al. | |
| 2009/0031728 A1* | 2/2009 | Miura et al. | 60/737 |
| 2009/0173075 A1* | 7/2009 | Miura et al. | 60/737 |
| 2009/0293484 A1* | 12/2009 | Inoue et al. | 60/740 |
| 2010/0251725 A1* | 10/2010 | Dodo et al. | 60/772 |
| 2011/0185703 A1* | 8/2011 | Dodo et al. | 60/39.461 |
| 2012/0031103 A1* | 2/2012 | Abe et al. | 60/776 |
| 2012/0094239 A1* | 4/2012 | Miura et al. | 431/9 |
| 2013/0029277 A1* | 1/2013 | Koizumi et al. | 431/354 |

FOREIGN PATENT DOCUMENTS

| | | | | | |
|---|---|---|---|---|---|
| JP | 2005-147459 A | | 6/2005 | | |
| JP | 2006-17381 A | | 1/2006 | | |
| JP | 2006-189252 A | | 7/2006 | | |
| JP | 2007-17023 A | | 1/2007 | | |
| JP | 2007-232235 A | | 9/2007 | | |
| JP | 2008-111651 A | | 5/2008 | | |
| JP | 2008-292138 A | | 12/2008 | | |
| JP | 2008-292139 A | | 12/2008 | | |
| JP | 2009-133508 A | | 6/2009 | | |
| JP | 4453675 A | | 2/2010 | | |
| JP | 2010-65963 A | | 3/2010 | | |
| JP | 2010-133621 A | | 6/2010 | | |
| JP | 2011226723 A | * | 11/2011 | | F23R 3/28 |
| JP | 2012063094 A | * | 3/2012 | | F23R 3/20 |

OTHER PUBLICATIONS

English translation of Japanese reference JP2010-133621 filed on Sep. 29, 2010.

Japanese Office Action dated Mar. 26, 2013 (one (1) page).

Japanese Office Action dated Dec. 20, 2011 with English translation (eight (8) pages).

* cited by examiner

COMBUSTOR AND OPERATING METHOD THEREOF

FIELD OF THE INVENTION

This invention is directed to a combustor and a method for operating a combustor.

BACKGROUND OF THE INVENTION

As regulations change and social pressures grow, it has become necessary to increase the efficiency of and lower NOx emissions from gas turbines.

One way to improve gas turbine efficiency is by increasing turbine inlet temperature. However, increasing combustion temperature can cause an increase in the amount of NOx emissions.

Japanese Patent Publication No. 2005-106305 publication shows a fuel combustion nozzle including a fuel nozzle to supply fuel to a chamber, and an oxidizer nozzle to supply an oxidizer to the chamber disposed downstream from the fuel nozzle where a fuel hole of the fuel nozzle and a oxidizer nozzle of the oxidizer nozzle are on the same axis. JP2005-106305 also shows a plate including the oxidizer nozzle where an outer peripheral portion is configured to be thicker than an inner peripheral portion in order to be able to initiate re-ignition when the flame generated from the coaxial jet of fuel and air blow off (see FIG. 1 of JP2005-106305).

SUMMARY OF THE INVENTION

JP2005-106305 does not show reduction of NOx emissions.

The purpose of the invention is to supply a combustor having a structure that reduces NOx emissions while maintaining combustion stability.

The present invention is directed to a combustor including a chamber to which fuel and air are supplied, an air hole plate having a plurality of air holes disposed upstream of the chamber, and a fuel nozzle to supply fuel to the plurality of air holes of the air hole plate, where a center of a chamber-side surface of the air hole plate is disposed to the chamber-side than an exit of the air hole at the most outer peripheral side.

The invention can supply a combustor with a structure that reduces NOx emissions and maintains combustion stability.

DETAILED DESCRIPTION OF VARIOUS EMBODIMENTS

Set forth below are descriptions for each of the exemplary embodiments.

Embodiment 1

Figure 3:
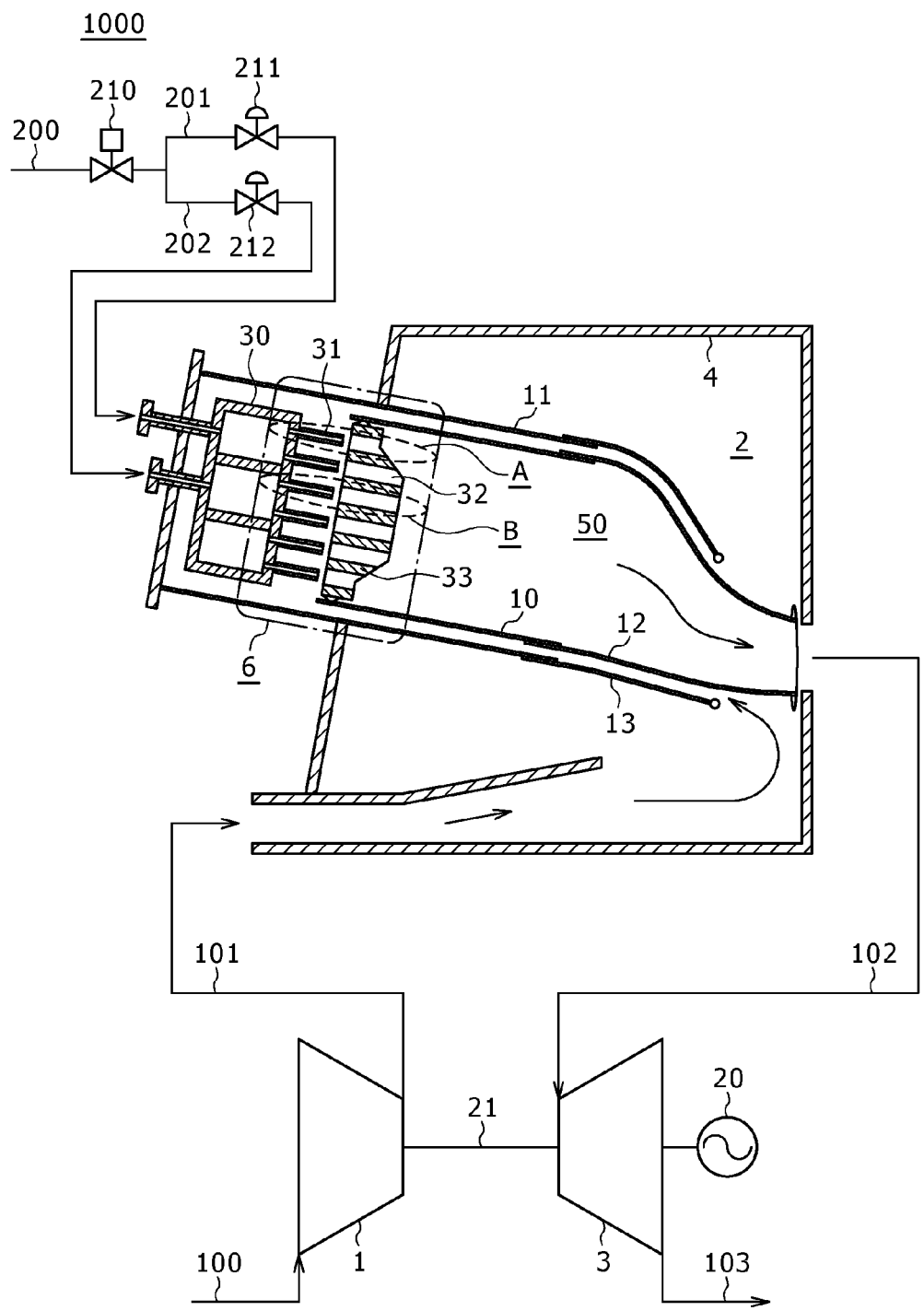
FIG. 3 illustrates a system structure of a plant, which shows a rough structure of a gas turbine plant for a combustor of the first embodiment.

FIG. 3 illustrates a whole structure of a power generating gas turbine plant 1000.

A power generating gas turbine in FIG. 3 includes a compressor 1 to generate high pressure air 101 by compressing atmospheric air 100, a combustor 2 to generate high temperature combustion air 102 by burning fuel 200 and high pressure air 101 generated by compressor 1, a turbine 3 driven by high temperature combustion air 102 generated by combustor 102, a power generator 20 rotated by a turbine 3 to generate power, and a shaft 21 to combine the compressor 1, the turbine 3, and the power generator 20.

The combustor 2 is located within a casing 4.

Combustor 2 has a burner 6 on its head, and a substantially cylindrical combustor liner 10 to separate high pressure air and combustion gas downstream of the burner 6.

Flow sleeve 11 is disposed on an outer peripheral side of the combustor liner 10, which serves as an outer wall to form a path to let high pressure air flow down. The flow sleeve is larger in diameter than the combustor liner 10, and is disposed as a cylindrical shape having almost the same center of its sectional circle as the combustor liner 10.

Downstream from the combustor liner 10, transition piece 12 is disposed to guide high temperature combustion gas 102 generated by the combustor 2 toward the turbine 3. Flow sleeve surrounding the transition piece 13 is disposed outside the transition piece 12.

Atmospheric air 100 becomes high pressure air 101 after being compressed by compressor 1. High pressure air 101 fills the casing 4, and flows into a space between the transition piece 12 and the flow sleeve surrounding the transition piece 13 to cool (convectional cooling) the transition piece from outside.

High pressure air 101 further flows toward the head of the combustor thorough the annular flow path formed between the flow sleeve 11 and the combustor liner 10. During the flow, the high pressure air 101 cools (via convectional cooling) the combustor liner 10.

A portion of the high pressure air 101 flows into the inside of the combustor liner 10 cooling (via film cooling) the combustor liner 10 through multiple cooling holes located at the combustor liner 10.

The remaining portion of high pressure air 101, i.e., not used for film cooling, flows into the combustor liner 10 through a plurality of air holes 32 located in the air hole plate 33 located on the upstream side of the chamber 50.

The second portion of high pressure air 101 flows into the combustor liner 10 through a plurality of air holes 32, is burned in the chamber 50 with fuel 200 jetted from fuel nozzles 31, to generate high temperature combustion gas 102. The high temperature combustion gas 102 is supplied to turbine 3 through transition piece 12.

High temperature combustion gas 102 is exhausted after driving the turbine 3 as exhaust gas 103.

Driving power made by the turbine 3 is delivered to compressor 1 and power generator 20 via shaft 21.

A portion of the driving power generated by turbine 3 drives the compressor 1 in order to generate high pressure air. Another portion of the driving power generated by turbine 3 generates electric power by rotating the power generator 20.

Set forth below is a description of a particular embodiment of the combustor 2.

A plurality of fuel nozzles 31 to jet fuel is installed to a nozzle header 30 in the burner 6 of the combustor 2 of embodiment 1. Each of the air holes 32 located in the air hole plate 33 has a corresponding fuel nozzle 31, and each of the air holes is located downstream from the corresponding fuel nozzle 31.

Figure 15:
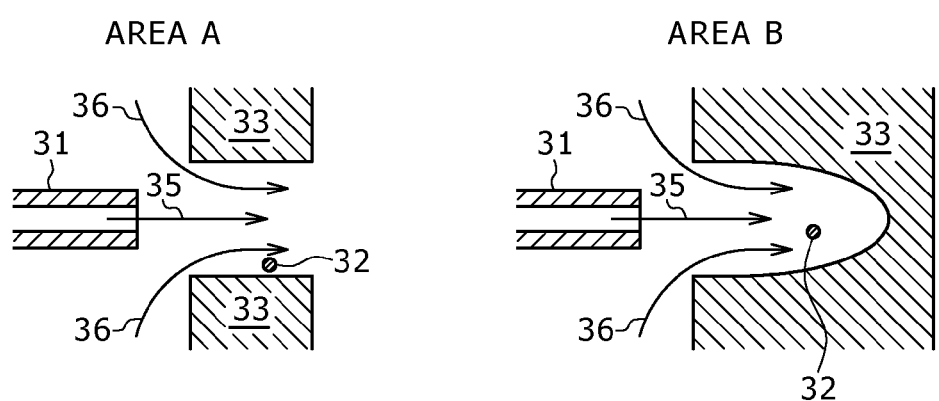
FIG. 15 illustrates a expansion figure for area A and area B of FIG. 3.

The detailed descriptions of area A and area B in FIG. 15 illustrate disposition of a pair of fuel nozzles 31 and air holes 32 in the combustor 2 shown in FIG. 3.

In area A, fuel nozzle 31 and air hole 32 located in the air hole plate 33 are disposed on the same axis. On the other hand, the axis of air hole 32 is inclined to the axis of fuel nozzle 31 in area B (details are described below). The cross-sectional shape of the air hole plate including the central axis of the air hole plate is shown as the detailed description of area B. All cross sectional shapes are described as cylinder shapes in order to simplify FIG. 1 to FIG. 14; however, other suitable shapes can be used. As shown in area A and area B, inside air holes, an air jet 36 flow surrounds fuel jet 35. Such kind a plurality of coaxial jets of fuel jet 35 and air jet 36 are formed as many number as the number of pairs of fuel nozzles and air holes 32. Corresponding pairs of fuel nozzles and air holes are typically referred to as coaxial jet nozzles.

Forming many small coaxial jets of fuel jets 35 and air jets 36 makes the boundary surface between fuel and air broader. At the exit side of air hole 32, a good mixture of fuel gas and air is formed. Burning the well-mixed gas in a chamber 50 can flat the distribution of combustion temperature and lower NOx emissions.

Burner 6 has two fuel supply lines, for F1 fuel 201 and for F2 fuel 202. Each fuel supply line has fuel control valve 211, 210. Flow volume of F1 fuel 201 is controlled by fuel control valve 211, and flow volume of F2 fuel 202 is controlled by fuel control valve 212 respectively. In that way, the power generated by gas turbine plant 1000 is controlled.

Figure 1:
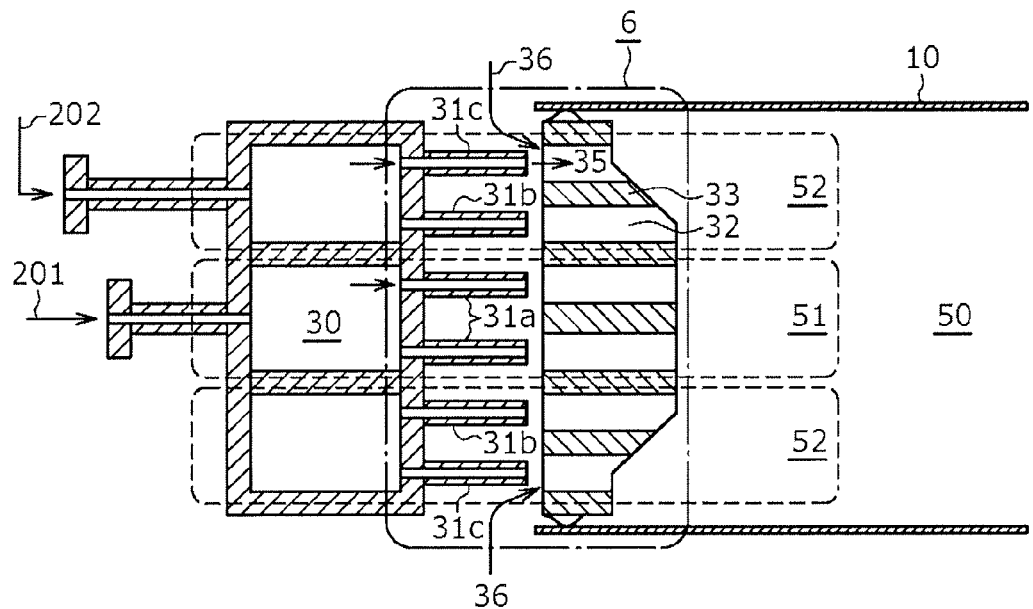
FIG. 1 illustrates a partial structure, which shows details of a disposition of an air hole plate and a fuel nozzle header, which constitute a fuel supply part, for a gas turbine of a first embodiment.
Figure 2A:
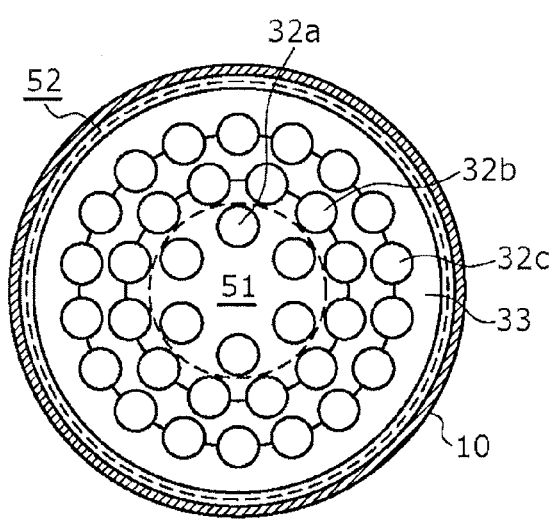
FIG. 2 illustrates a front view from a chamber, for the air hole plate of a first embodiment, as shown in FIG. 1.

FIG. 1 illustrates a cross-sectional view of enlargement around fuel nozzles 31 and air holes 32 of the gas turbine plant shown in FIG. 3. FIG. 2(a) is a front view of an air hole plate 33 viewed from the chamber 50 side.

In this embodiment, air holes 32 are arranged as three circles, which have sole center as concentric circles, and each circle has 6, 12, 18 air holes 32 respectively from inside. Air holes of the each circle are named as first circle air holes 32a, second circle air holes 32b, third circle air holes 32c, respectively from the center outward.

Figure 2B:
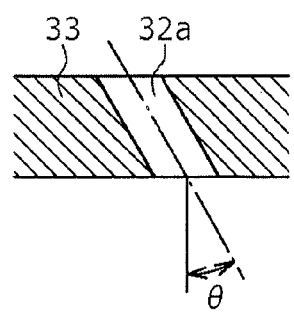

To form a swirl flow in chamber 50, first circle air holes 32a are slanted from the burner axis direction (center axis of fuel nozzle) at an angle θ. FIG. 2(b) shows first air holes 32a cut in circumferential direction of burner.

In addition, the fuel line of this embodiment is divided into a line to supply F1 fuel 201 and a line to supply F2 fuel 202. F1 fuel 201 is supplied to fuel nozzles 31a (a group of first fuel nozzles) which correspond to first circle air holes 32a, F2 fuel 202 is supplied to fuel nozzles 31b and 31c (a group of second fuel nozzles), which correspond to second circle air holes 32b and third circle air holes 32c.

In this embodiment, first circle fuel nozzles 31a to which F1 fuel 201 is supplied, and air holes 32a, which correspond to the fuel nozzles 31a, form an inner peripheral coaxial jet nozzle group 51. Second circle fuel nozzles 31b and third circle fuel nozzles 31c to which F2 fuel 202b supplied, and second circle air holes 32b, which correspond to the fuel nozzles 31b, and third circle air holes 32c, which correspond to the fuel nozzles 31c, form an outer peripheral coaxial jet nozzle group 52. And the portion surrounded by the dotted line in FIG. 1 constitute burner 6. In other words, burner 6 has an air hole plate and fuel nozzles 31a, 31b, 31c, which correspond to a plurality of air holes 32a, 32b, 32c, respectively.

The chamber side wall face of an air hole plate 33 is a face on which air hole exits are arranged. As for chamber side wall face, inner peripheral wall face is disposed at downstream side of chamber than outer peripheral wall face. Therefore, exits of first circle air holes 32a arranged in inner peripheral wall face are disposed at downstream side of chamber than exits of third circle air holes 32c arranged in outer peripheral wall face. And, in order to decrease downstream side radial distance from the center axis of air hole plate rather than upstream side, connecting wall face that connects inner peripheral wall face of chamber side and outer peripheral wall face of chamber side is slanted to the center axis. Therefore the connecting wall face is a frusto-conical shape.

With an air hole plate of this shape, outer peripheral coaxial jet nozzle group 52 is disposed upstream (in the burner-axis direction) from the inner peripheral coaxial jet nozzle group 51.

Figure 4:
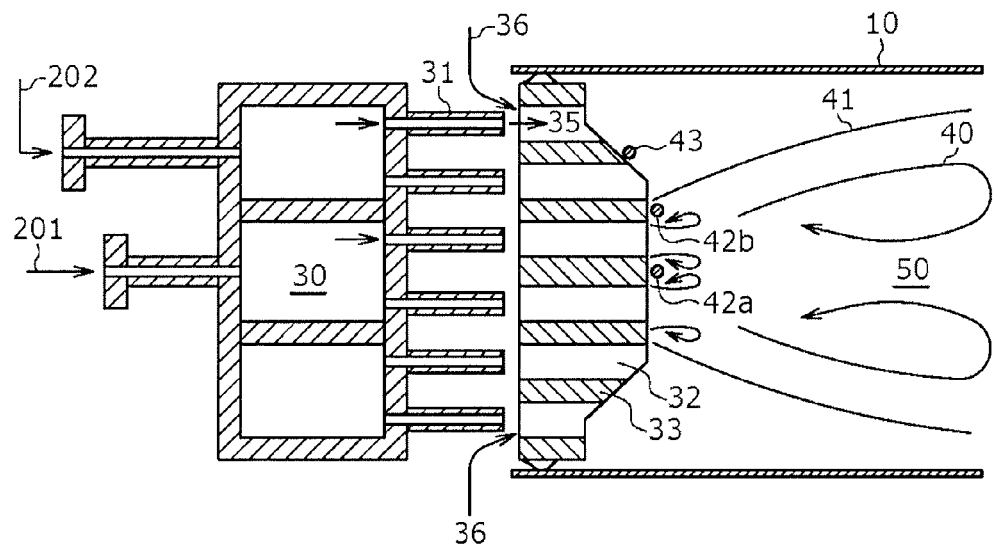
FIG. 4 illustrates a flow of fuel and air with a disposition of an air hole plate, fuel nozzle, and a fuel nozzle header, which constitute a fuel supply part, for a gas turbine of a first embodiment.

FIG. 4 illustrates a rough shape of the flame generated by a burner of this embodiment, and a flow of fluid.

Chamber side wall face of air hole plate 33, which constitutes the inner peripheral coaxial jet nozzle group 51, is vertical to the burner axis (that is to say the central axis of air hole plate). Therefore, stagnation region 42a and 42b are formed in the vicinity of exits of first circle air holes 32a.

In the vicinity of stagnation region 42a and 42b, because of stagnation, flow becomes slower to form a local region where combustion speed matches flow speed. From the local region where combustion speed matches flow speed, as a basic point, flame 41 is formed. In addition, recirculation flow 40 is formed because first circle air holes 32a are disposed to be slanted toward the burner axis (center axis of air hole plate). By the recirculation flow 40, high temperature combustion gas is transported from down stream of flame 41 to upstream of flame 41, and thermal energy is also transported from downstream to upstream. Therefore pre-combustion gas supplied from air holes 32 to chamber is heated to rise reaction possibility. For those reasons, inner peripheral coaxial jet nozzle group 51 can be a burner that has high combustion stability.

On the other hand, outer peripheral coaxial jet nozzle group 52 has a connecting portion 43 that connects inner peripheral wall face and outer peripheral wall face. The wall face of connecting portion is slanted in order to make the radial distance from the center of air hole plate to the wall face in the downstream side closer than that in upstream side. Flow in the vicinity of wall face of connecting portion between second circle air holes 32b and third circle air holes 32c is less likely to stagnate because of the slant to the burner axis. Therefore, flame is not formed in the vicinity of an air hole plate 33 that constitutes outer peripheral coaxial jet nozzle group 52. As shown in FIG. 4, flame 41 is formed in which fuel supplied from inner peripheral coaxial jet nozzle group 51 acts as a spark. As for the radial distance of the wall face of connecting portion from the center axis of an air hole plate, wall face of connecting portion is slanted in order to make the downstream side of the chamber shorter than the upstream side, so flow separation of premix gas flow can be restrained make it harder for the flow to stagnate.

In this embodiment, fuel and air in the coaxial jet, which flow through internal path of air hole 32, are mixed in the internal path. Further, flow path is expanded sharply from the internal path to chamber. Therefore the mixture of fuel and air progresses further even after supplied into the chamber.

Sufficient mixture between fuel and air makes local temperature constant. Therefore, the structure shown in this embodiment is efficient for generating low NOx. That is to say, for a burner that has a significant coaxial jet of fuel and air such as shown in this embodiment, it is preferable that fuel is burned where the mixture between fuel and air is well mixed. In other words, to form flame 41 in an area apart from exits of air holes 32 is preferable.

In the combustor shown in this embodiment, as shown in FIG. 4, flame 41 is formed in stable having a base point, inner peripheral coaxial jet nozzle group 51 creates a high stablility burner. Therefore for the chamber side wall face of air hole plate, flame 41 is formed apart from exits of second circle air holes 32b and exits of third circle air holes 32c, in the outer peripheral coaxial jet nozzle group 52, by having inner peripheral wall face downside of outer peripheral wall face in chamber. In this way, the mixture between fuel and air progresses not only by the effect of sharp expansion at exits of air holes 32, but also on the way to flame 41 from exits of air holes 32. Therefore, flame temperature can be flat to create low NOx combustion.

As explained above, having an inner peripheral coaxial jet nozzle group and an outer peripheral coaxial jet nozzle group in this embodiment enables both low NOx and stability in burning.

Figure 5:
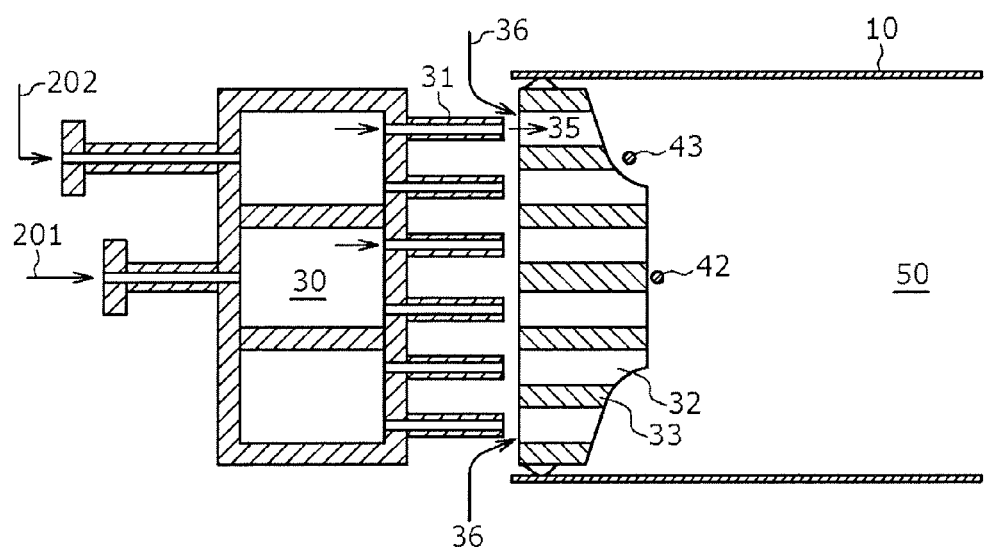
FIG. 5 illustrates another example of a partial structure, which shows a details of a disposition of an air hole plate and a fuel nozzle header, which constitute a fuel supply part, for a gas turbine of a first embodiment.

In this embodiment, connecting wall face that connects inner peripheral wall face and outer peripheral wall face is shaped as a taper. FIG. 5 illustrates a similar combustor that is supplied by connecting an inner peripheral coaxial jet nozzle group 51 and an outer peripheral coaxial jet nozzle group 52 with a curved wall.

That is to say, if inner wall face and outer wall face are connected with a flat wall or smooth wall, a low NOx effect can be obtained. Because that structure makes it possible to have a certain distance between air holes 32b and 32c located in the connecting portion or outer peripheral wall face, and to advance a mixture between fuel and air that passes through these air holes 32b and 32c.

The smooth face means that the changing rate of the slope in the face is low enough not to make flow stagnation or flow separation. If it has low influence to hold a flame, the benefit can be obtained. In that meaning, a combination of flat faces, or a combination of flat faces and curved faces is acceptable.

Figure 7:
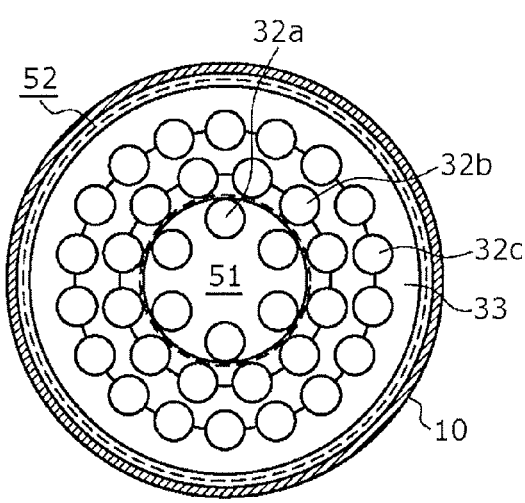
FIG. 7 illustrates a front view from a chamber, for the air hole plate of a first embodiment as shown in FIG. 6.

The inner peripheral wall face in this embodiment means corresponding potion of chamber side face of an air hole plate 33 to inner peripheral coaxial jet nozzle group 51. Inner peripheral wall face is vertical plane to the central axis direction of an air hole plate 33. Outer peripheral wall face is also vertical plane to the central axis direction of an air hole plate 33. In this embodiment, outer peripheral wall face means a face outside the lines, which connect air holes 32c as shown in FIG. 7.

A combustor shown in this embodiment has two fuel lines, F1 fuel 201, which is supplied to inner peripheral coaxial jet nozzle group 51 and F2 fuel 202, which is supplied to outer peripheral coaxial jet nozzle group 52.

Raising the ratio of fuel flow to air flow is an efficient way to raise the stability of combustion. To increase fuel flow supplied to fuel nozzles 31a per single nozzle so that the flow is more than the fuel supplied to fuel nozzles 31b or 31c per single nozzle increases the ratio of fuel flow to air flow of inner peripheral coaxial jet nozzle group 51, and the temperature of the holding point of the flame is raised. Therefore the stability of the flame can be improved.

But just increasing the amount of F1 fuel 201 jetted from inner peripheral coaxial jet nozzle group 51 changes the amount of fuel 200 supplied to whole burner 6, and changes the output gained from a plant too. So in this embodiment, the amount of F2 fuel 202 flow is lowered at the same time as the amount of F1 fuel 201 flow is raised. This enables the ratio of fuel flow to air flow of inner peripheral coaxial jet nozzle group 51 to be raised without increasing fuel 200 supplied to the whole burner 6.

In this embodiment, the fuel ratio per single nozzle that is supplied to first fuel nozzles 31a, which corresponds to first air holes 32a, is more than the fuel ratio per single nozzle that is supplied to second fuel nozzles 31b, 31c, which corresponds to second air holes 32b, 32c.

Because the amount of fuel 200 supplied to whole burner 6 is not changed in this way, the amount of output obtained from plant will not change. Therefore, combustion stability of flame 41 formed by burner 6 can be higher, and the increase of NOx exhausted by the whole burner 6 can be restrained.

Figure 6:
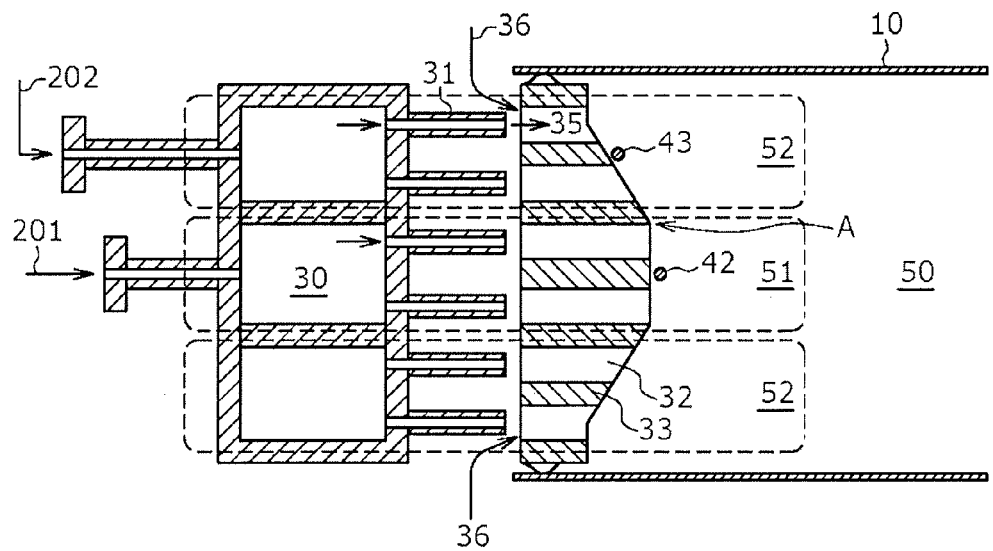
FIG. 6 illustrates another example of a partial structure, which shows a details of a disposition of an air hole plate and a fuel nozzle header, which constitute a fuel supply part, for a gas turbine of a first embodiment.

FIG. 6 shows another example of the first embodiment that has wider connecting wall face that connects inner peripheral wall face and outer peripheral wall face of an air hole plate. That is to say, the structure that has a taper shape from the very outer peripheral side (A in the FIG. 6) of air holes 32a of inner peripheral coaxial jet nozzle group 51 toward outer peripheral side.

FIG. 7 is a front view of FIG. 6 from chamber 50 side.

Figure 8:
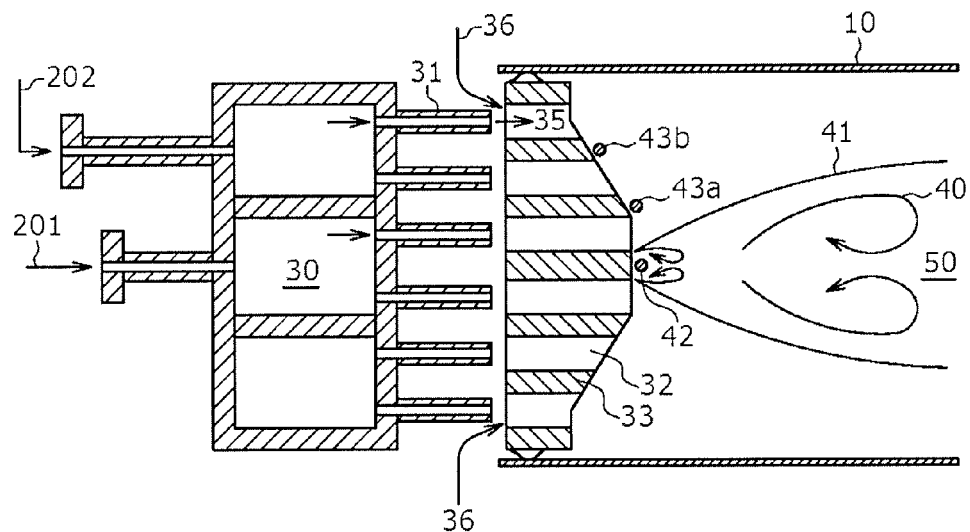
FIG. 8 illustrates another example of a flow of fuel and air with a disposition of an air hole plate, fuel nozzle, and a fuel nozzle header, which constitute a fuel supply part, for a gas turbine of a first embodiment.

FIG. 8 shows a rough shape of flame by burner shown in FIG. 6 and flow of fluid. In FIG. 8, the balance point between the speed of flow and the speed of combustion is formed at stagnation region 42. In other words, at the region inside first circle air holes 32a. So, flame 41 is formed as shown in FIG. 8.

Embodiment 2

Figure 9:
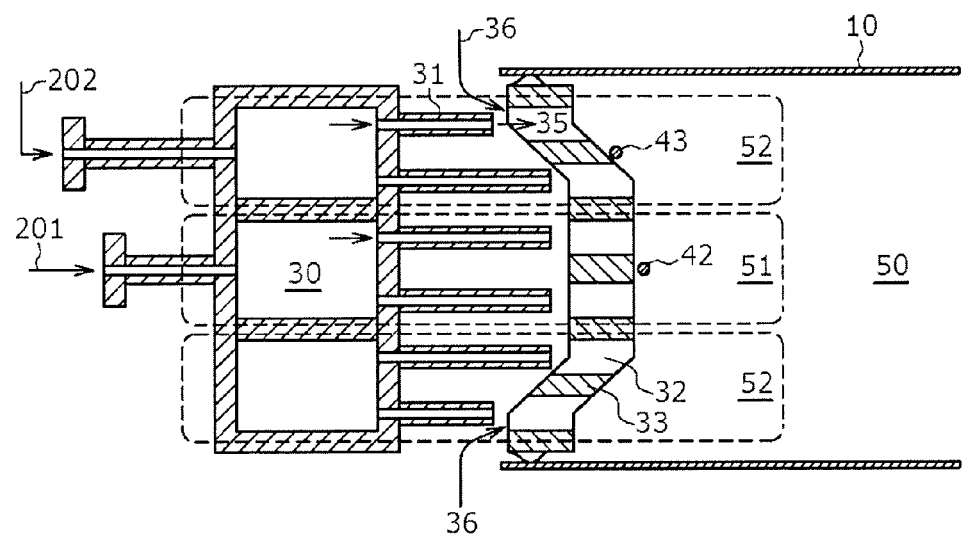
FIG. 9 illustrates a partial structure, which shows details of a disposition of an air hole plate and a fuel nozzle header, which constitute a fuel supply part, for a gas turbine of a second embodiment.

What follows is a description of a gas turbine combustor of a second embodiment, illustrated in FIG. 9.

As the structure of the combustor of this embodiment is substantially similar to the structure of embodiment 1, only the portions that differ will be discussed.

Figure 10:
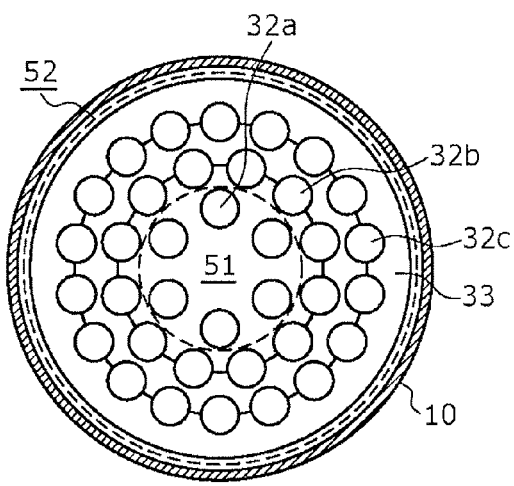
FIG. 10 illustrates a front view from a chamber, for the air hole plate of a second embodiment shown in FIG. 9.

FIG. 9 is a rough cross section of the enlarged vicinity portion of fuel nozzles 31 and air holes 32, and FIG. 10 is a front view of an air hole plate 33 from a chamber 50 side.

In this embodiment, thickness of the air hole plate 33 is substantially flat at each position in a radial direction. That is to say, chamber side wall face and fuel nozzle side wall face are in parallel.

In this embodiment, the thickness of the air hole plate 33 is substantially flat in a radial direction, so internal path lengths of each air hall are also the same between all holes. Therefore, pressure loss caused by air jet 36 passing through an air hole 32 can be constant at any air hole 32 location.

In addition, in order to make the distance between a fuel hole of a fuel nozzle 31 and an entrance of an air hole 32 equal, the length of first and second fuel nozzles 31 is longer than the length of third fuel nozzles 31. This structure enables the distribution of flow in an air hole entrance to be kept flat, and the entrance pressure loss caused by air jet 36 entering into an air hole 32 to be constant at any air hole 32 location.

In that way, pressure losses caused by air jet 36 passing through and entering into an air hole 32 can be constant at any air hole 32 location. And the pressure difference between the upstream side and downstream side of the air hole plate 32 can be constant at any air hole 32 location.

This configuration can prevent the air jet 36 flow rate from causing deviation by the location of air holes 32 of the air hole plate 33.

Air flow ratio can be constant at any fuel rate at any air hole 32 location, so as to limit an unintentional rise of local combustion temperature and a corresponding increase in NOx emissions.

Therefore, sufficient combustion stability can be gained with inner peripheral coaxial jet nozzle group 51, and low NOx combustion can be done with outer peripheral coaxial jet nozzle group 52, and a combustor with a structure that improves both NOx emissions and combustion stability.

Embodiment 3

Figure 11:
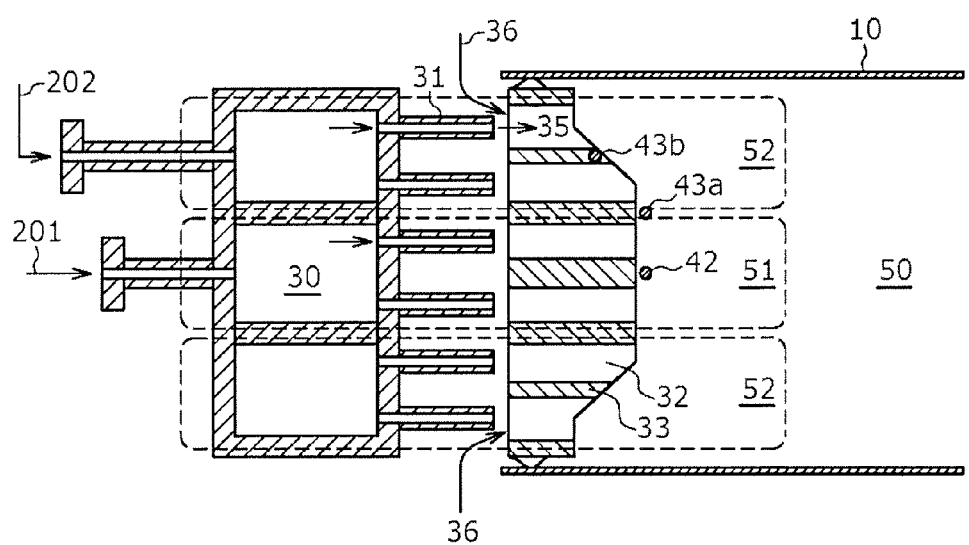
FIG. 11 illustrates a partial structure, which shows details of a disposition of an air hole plate and a fuel nozzle header which constitute a fuel supply part, for a gas turbine of a third embodiment.

What follows is a description of a gas turbine combustor of third embodiment with FIG. 11.

As the structure of the combustor of this embodiment is substantially similar to the structure of embodiment 1, only the portions that differ will be discussed.

Figure 12:
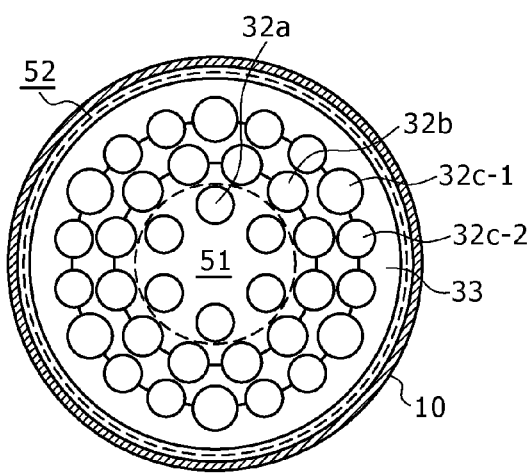
FIG. 12 illustrates a front view from a chamber, for the air hole plate of a third embodiment as shown in FIG. 11.

FIG. 11 is a rough cross section of the enlarged vicinity portion of fuel nozzles 31 and air holes 32, and FIG. 12 is a front view of a air hole plate 33 from a chamber 50 side.

In this embodiment, the structure of inner peripheral coaxial jet nozzle group 51 is the same as embodiment 1. But air holes 32b and 32c in outer peripheral coaxial jet nozzle group 52 have different diameters at each location in an air hole plate 33. That is to say, among third circle air holes 32c in the outer peripheral coaxial jet nozzle group 52, the air holes 32c that have a longer distance from second circle air holes have a larger diameter; on the other hand, the air holes 32c that have a shorter distance from second circle air holes have a smaller diameter.

This embodiment is illustrated in FIG. 12.

Air holes 32c-1 that are a part of third circle air holes 32c in an outer peripheral coaxial jet nozzle group 52. The location of an air hole 32c-1 in circumferential direction, is next to another air holes 32c-1, and between second air holes 32b, which are arranged in a circumferential direction. The distance between a third circle air hole 32c-1 and a second circle air holes 32b is the longest, so hole diameters are enlarged as shown in the figure.

On the other hand, other air holes 32c, which are air holes 32c-2, are different air holes from 32c-1. Since each air hole 32c-2 has a short distance from second circle air holes 32b, hole diameters are narrowed, as show in the figure.

In that way, air holes 32c are enlarged or narrowed as to the distance from adjacent second holes 32b. That is to say, each remained wall area of the air hole plate 33 between third circle air holes 32c and second circle air holes 32b are substantially equalized.

In chamber side wall face of an air hole plate 33, flow stagnation is limited by reducing the area of connecting portion 43a and 43b where air holes 32 are not located. Reducing the stagnation region with that structure, restrain balancing points between combustion speed and flow speed to be formed in the vicinity of connecting portion 43a and 43b, and make it hard to form flame 41 in the vicinity of connecting portion 43a and 43b.

On the other hand, as for inner peripheral coaxial jet nozzle group 51, stable flame 41 is formed at a pilot point where flow speed and combustion speed are balanced, in the vicinity of stagnation region 42.

Therefore, as for outer peripheral coaxial jet nozzle group 52, flame 41 is formed apart from exits of air holes 32b and 32c. Because flame is formed where fuel and air are well mixed, combustion temperature can be flat, and low NOx combustion is achieved in outer peripheral coaxial jet nozzle group 52.

Thus, securing enough combustion stability with inner peripheral coaxial jet nozzle group 51, and achieving low NOx combustion with outer peripheral coaxial jet nozzle group 52, enable to supply a combustor with a structure which improve both low NOx emission and combustion stability.

Embodiment 4

Figure 13:
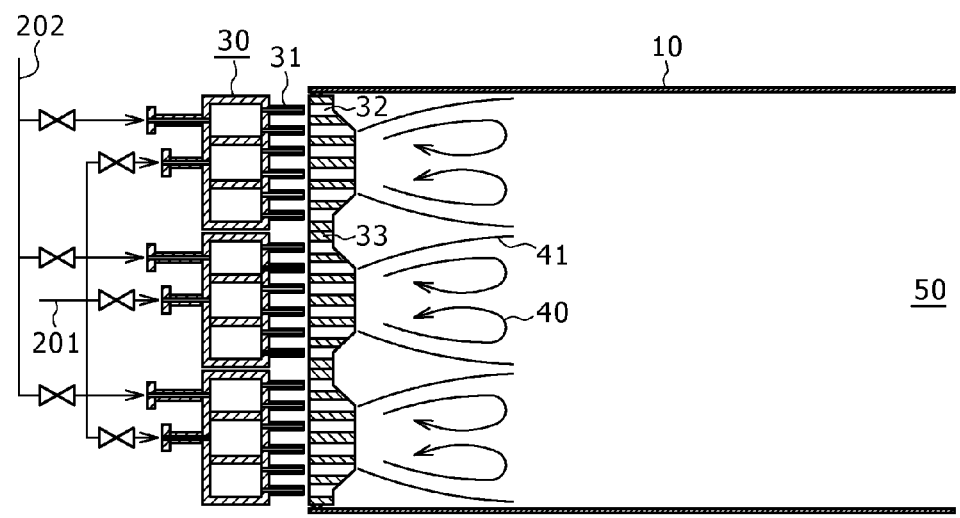
FIG. 13 illustrates a partial structure figure, which shows a details of a disposition of an air hole plate and a fuel nozzle header, which constitute a fuel supply part, for a gas turbine of a fourth embodiment.

What follows is a description of a gas turbine combustor of forth embodiment with FIG. 13.

As the structure of the combustor of this embodiment is substantially similar to the structure of embodiment 1, only the portions that differ will be discussed.

This embodiment shows one combustion devise that is constituted by combining seven burners 6, which is described in the first embodiment.

Figure 14:
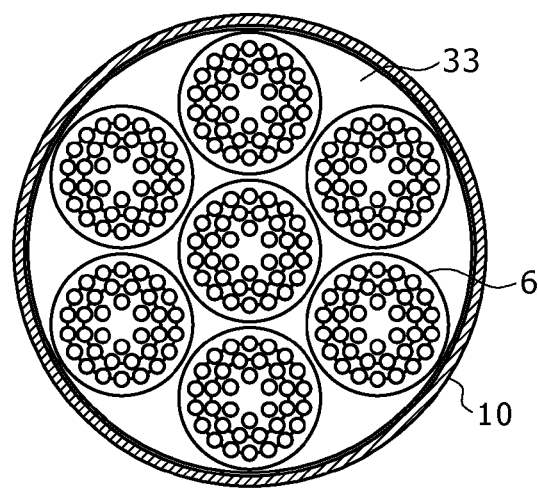
FIG. 14 illustrates a front view from a chamber, for the air hole plate of a fourth embodiment as shown in FIG. 13.

FIG. 13 is a rough cross section of the enlarged vicinity portion of fuel nozzles 31 and air holes 32, and FIG. 14 is a front view of a air hole plate 33 from a chamber 50 side.

As illustrated in FIG. 13, one burner is disposed in the center, and six burners are disposed around the center burner. Two fuel supply lines are connected to each burner 6. Each burner 6 has a structure that is illustrated in FIG. 1.

As shown in FIG. 13, dividing fuel supply lines between inner peripheral coaxial jet nozzle group 51 and outer peripheral coaxial jet nozzle group 52, enables the combustor to control the number of burners to work based on gas turbine load. Therefore, stable combustion is achieved by controlling the flow rate of F1 fuel and F2 fuel supplied to each burner from start condition to 100% load condition. Each burner can have an individual fuel supply line. In this case, although the total number of fuel supply lines increases, operation can be improved in partial load condition and can operate stably at any load condition.

One combustion device can be constituted by combining burners 6 illustrated in FIG. 1-3.

Thus, this combustor has a structure that improves both NOx emissions and combustion stability.

In the combustor 2 of this embodiment described above, including a chamber 50 to that fuel and air are supplied and in that they are burned, a air hole plate 33 located upstream from chamber in main gas direction and having a plurality of air holes 32, a plurality of fuel nozzles 31 to supply fuel to the air holes 32 located upstream from the air hole plate 33. The air hole plate 32 forms a upstream wall of the chamber 50, and has a plurality of air holes 33 arranged in concentric circles. The air holes 32 are slanted to the axis of the air hole plate 33 to promote a recirculation flow 40 from downstream side to upstream side of a flame.

In the combustor 2 described in each embodiment, the center of the chamber side (downstream side) face of the air hole plate 33 is located at chamber side (downstream side) from exits of the most outside air holes 32c. In addition, the distance from the axis of the air hole plate of a certain point on the chamber side face of the air hole plate 33 (e.g. 43a in FIG. 8) is less than a point that is located upstream from the certain point (e.g. 43b in FIG. 8). By introducing such structure, air holes disposed on a outer peripheral side of the air hole plate 33 can be apart from a flame formed downstream from the center portion of the sir hole plate 33. In that way, the mixture of fuel and air passing through outer peripheral side air holes can be accelerated, and NOx emission can be reduced.

In addition, in the combustor 2 described in each embodiment, inner peripheral side of the air hole plate 33 (i.e. in the vicinity of the center of side wall of the chamber 50) is a flat face perpendicular to the axis of the air hole plate. Therefore, stagnation region 42a, 42b is formed on the inner peripheral wall side.

A portion of mixture of fuel and air jetted from air holes 32a flows into the stagnation region. In that way, mixed gas is supplied to a late flow region, and recirculation flow 40 transfer heat from combustion gas to the stagnation region to form a stable flame. Flame 41 is folded downstream from the inner peripheral wall face, and the stable flame in the stagnation region improves the stability of a whole flame 41.

Because the center of the chamber-side side wall face of the air hole plate 33 improves stability of flame 41 in this embodiment, a possibility of blow off is restrained and high reliability is achieved.

Embodiment 5

Figure 16:
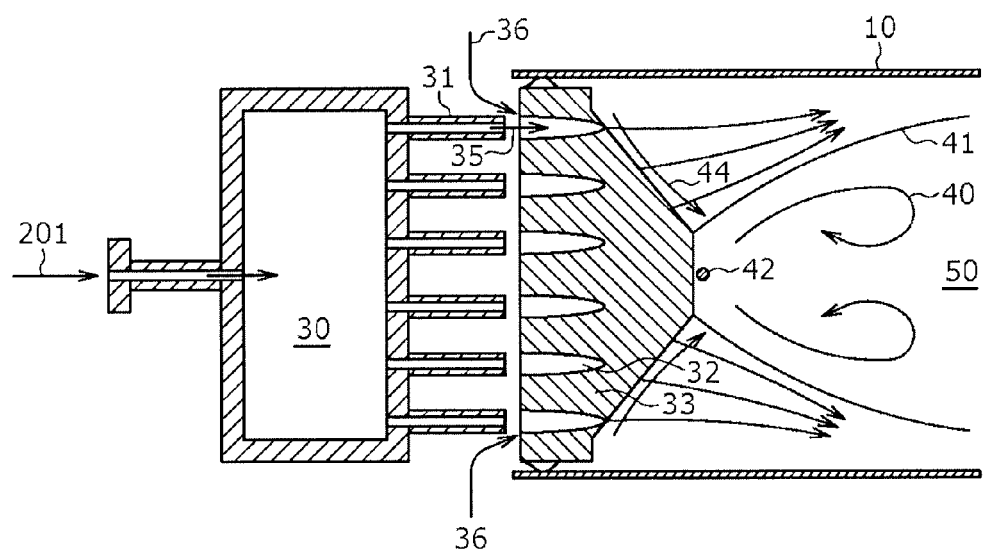
FIG. 16 illustrates a partial structure figure, which shows a details of a disposition of an air hole plate and a fuel nozzle header, which constitute a fuel supply part, for a gas turbine of a fifth embodiment.
Figure 17:
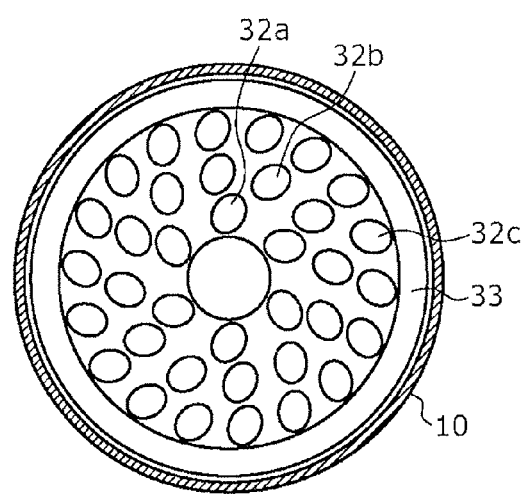
FIG. 17 illustrates a front view from a chamber, for the air hole plate of the embodiment 5 as shown in FIG. 16.

A fifth embodiment is shown in FIG. 16 and FIG. 17. FIG. 16 is a rough cross section of the enlarged vicinity portion of fuel nozzles 31 and air holes 32, and FIG. 17 is a front view of a air hole plate 33 from a chamber 50 side.

In this embodiment, exit of air holes 32 is located on a wall face of connecting portion which connects inner peripheral wall face and outer peripheral wall face of air hole plate 32. In order to make downstream side wall face closer than upstream side in radial distance from burner axis, wall face of connecting portion is more slanted than upstream side face of air hole plate. Therefore, flow separation can be limited and stagnation of premix gas flow can be limited.

On the other hand, all air holes 32 are slanted toward the burner axis in this embodiment. Therefore, a strong swirl is formed in chamber 50, and a large recirculation flow 40 is generated. Because the recirculation flow 40 is formed on a bulged portion bulged toward chamber 50, entrainment by the recirculation flow 40 generate a flow 44 that flows toward the recirculation flow 40 in the vicinity of wall face of air hole plate, as shown in FIG. 16. The flow 44 prevents high temperature combustion gas from flowing out toward first circle air holes 32a.

Thus, heat is not supplied to the vicinity of first circle air holes 32a, stagnation regions are not easily formed, flames sticking to the air hole plate are limited, and flame 41 is formed from inner peripheral wall face of the top of the air hole plate. In this embodiment, no air holes 32 are located downstream face of the air hole plate 33. That is to say, air holes located at the innermost region are located at the connecting face which connects an inner peripheral flat face and an outer peripheral flat face. Therefore, not only for other fuel nozzles but also for first fuel nozzles, sharp expansion at an exit of each air hole 32 and enough distance from an exit of each air holes to flame 41 enable to accelerate mixture of fuel and air, and well-reduced NOx is exhausted from burner.

Figure 18:
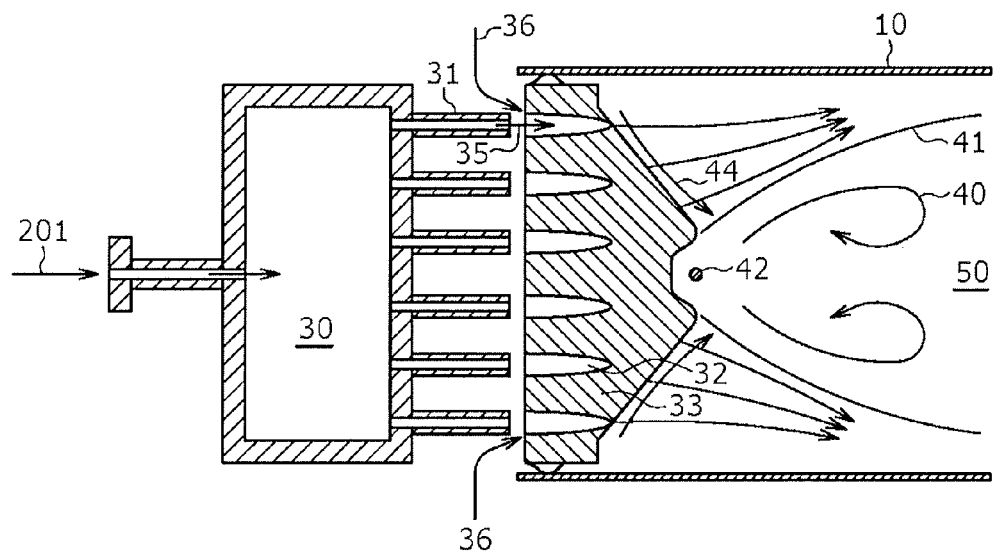
FIG. 18 illustrates another example of a partial structure, which shows a details of a disposition of an air hole plate and a fuel nozzle header, which constitute a fuel supply part, for a gas turbine of a fifth embodiment.

A combustor of this embodiment also preserves combustion stability. Strengthening swirl flow by sharpening the slanted angle of air holes forms a large recirculation flow 40 by enlarging the top area of an air hole plate, and forms a stable flame 41. As a further improvement of combustion stability, a further stagnation promotion structure can be introduced such as a dent on the top of air hole plate as shown in FIG. 18. Promotion of stagnation in that portion improves combustion stability. To enlarge stagnation region 42 improves the stability of flame 41.

In a combustor 2 in this embodiment, all air holes are located in the connection face that connects an inner peripheral flat face and an outer peripheral flat side. Such a structure can prevent a stagnation region from being formed in the vicinity of exit of each air hole 32, with the effect of flow 44 formed by entrainment of recirculation flow 40, as synergism.

Air hole plate 33 in this embodiment does not have air holes in an inner peripheral flat face. That structure can be regarded a stagnation promotion structure, or flame stability strengthen structure.

In this embodiment, in order to simplify fuel supply lined to save cost, fuel is supplied via single supply line to fuel nozzles in three circle. But this embodiment can have a plurality of supply line as shown in embodiment 1.

Figure 19:
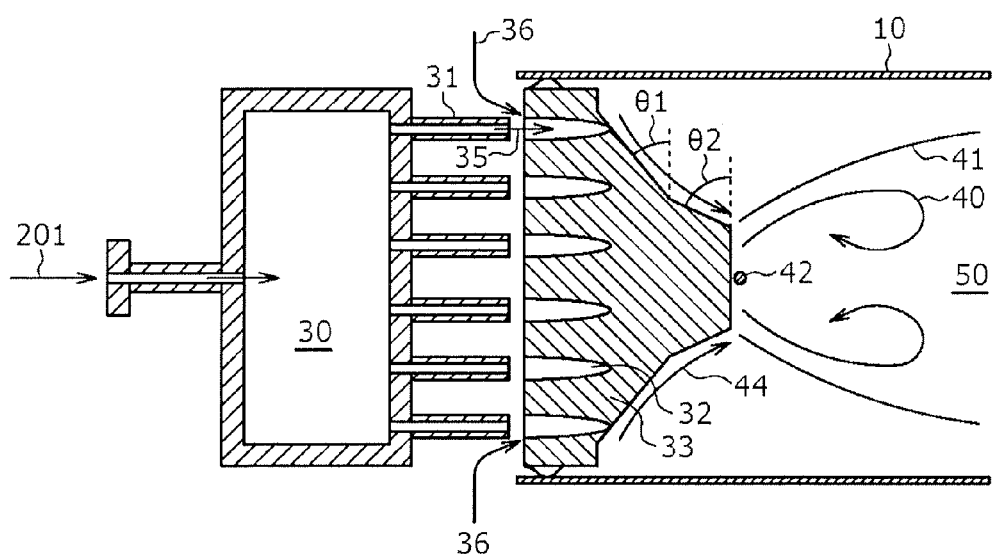
FIG. 19 illustrates another example of a partial structure, which shows a details of a disposition of an air hole plate and a fuel nozzle header, which constitute a fuel supply part, for a gas turbine of a fifth embodiment.

In the fifth embodiment, the angle of connecting wall face that connects inner peripheral wall face and outer peripheral wall face can be varied as shown in FIG. 19, and angle $\theta_2$ can be larger than $\theta_1$. Such shape can enlarge burner axis element of speed vector of flow 44 generated by entrainment of recirculation flow 40 in the vicinity of the top of air hole plate 33, while keeping the air hole plate 33 thin. Thus the effect to prevent combustion gas in recirculation flow 40 from flowing out toward first circle air holes can be stronger. An arc shape of the connecting wall face can have the same effect.

Embodiment 6

Figure 20:
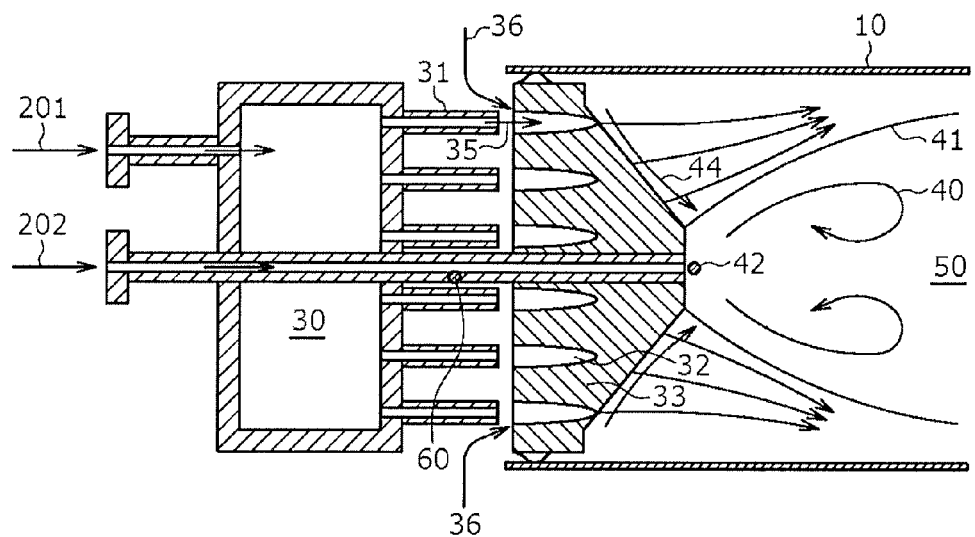
FIG. 20 illustrates a partial structure figure, which shows a details of a disposition of an air hole plate and a fuel nozzle header, which constitute a fuel supply part, for a gas turbine of a sixth embodiment.
Figure 21:
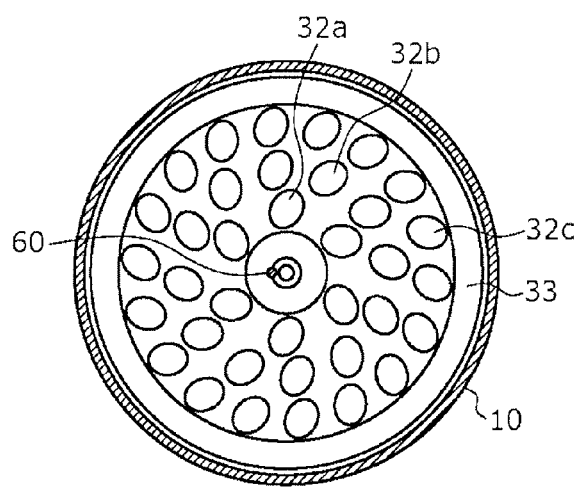
FIG. 21 illustrates a front view from a chamber, for the air hole plate of a sixth embodiment as shown in FIG. 20.

A sixth embodiment is shown in FIG. 20 and FIG. 21. FIG. 20 is a rough cross section of the enlarged vicinity portion of fuel nozzles 31 and air holes 32, and FIG. 21 is a front view of a air hole plate 33 from a chamber 50 side. In this embodiment, although an air hole plate 33 has similar shape as embodiment 5, pilot nozzle 60 is disposed at the center of burner (the center of air hole plate 33) as a fuel supply means. The pilot nozzle 60 jets low flow rate fuel to a stagnation region 42, to generate flame 41 as diffusion combustion at a flame-holding point, and burn stably even if average combustion temperature is low. Because it can get sufficient effect with low flow rate of fuel supplied from the pilot, combustion stability can be improved with restraining the increase of NOx discharge.

Figure 22:
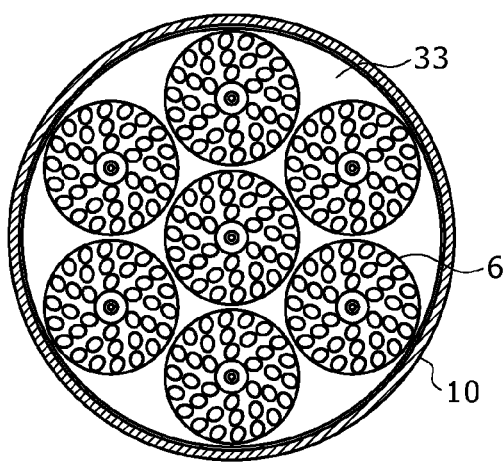
FIG. 22 illustrates a front view from a chamber, for the air hole plate with seven burners of the sixth embodiment, as shown in FIG. 20.
Figure 23:
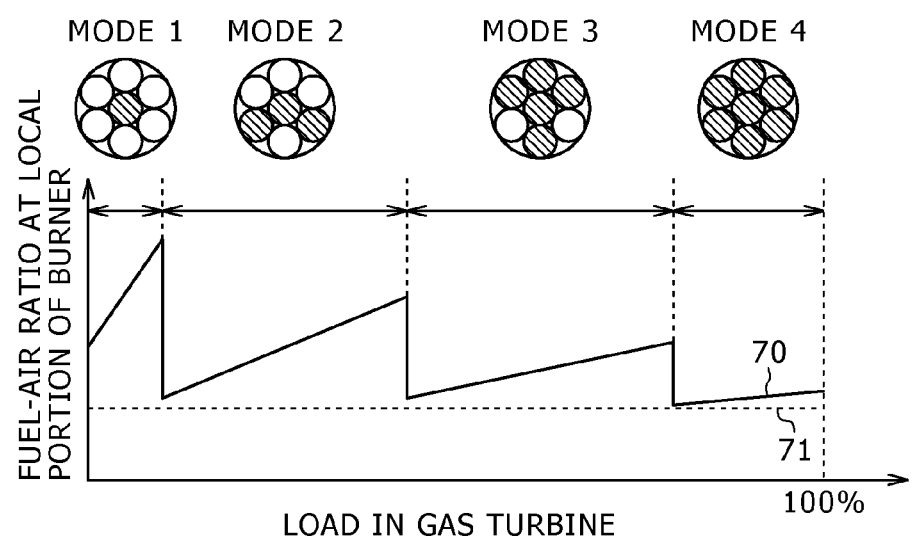
FIG. 23 illustrates an example of fuel-air ratio at a local portion of burner for load in gas turbine.

A front view of a gas turbine combustor that has seven burners of the sixth embodiment is shown in FIG. 22. An example of gas turbine operation without using pilot nozzles is shown in FIG. 23. It is necessary to operate gas turbine stably within a wide fuel-air ratio range operation from start to regular load operation. Therefore the number of burners is controlled while considering fuel flow rate condition.

FIG. 23 shows transition of burner local fuel-air ratio of operation example 70. In FIG. 23 (and FIG. 24 mentioned later), ● means burner with fuel, ○ means burner without fuel. As for operation example 70, during low fuel flow rate condition, the system operates in mode 1 to supply fuel only to central burner. After mode 1, a switch to mode 2 is made to supply fuel to three burners corresponding to the increase of fuel flow rate. Then, a switch to mode 3 is made to supply fuel to five burners with further increase of fuel flow rate. Further, a switch to mode 4 is made to supply fuel to all seven burners increasingly. In that way, there is an increase in the number of burners to supply fuel.

Local fuel air ratio of the burner decreases right after switching of fuel supply line. If fuel air ratio falls below lower limit 71, combustion become unstable and can be blown out in some situations. Therefore, it is necessary to keep burner local fuel-air ratio over the lower limit 71 during operation. It is necessary in power generation gas turbine operation to keep the load range out from fuel switching. At the time of switching, burner local fuel-air ratio can fluctuate sharply, so, it is required to improve gas turbine operation ability by lowering switching condition from mode 3 to mode 4 in order to broaden a load range of operation.

Figure 24:
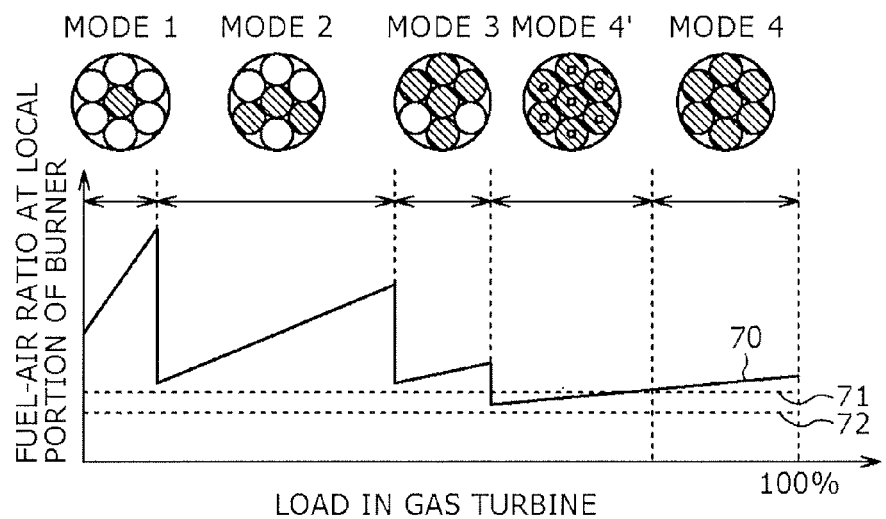
FIG. 24 illustrates an example of fuel-air ratio at a local portion of burner for load in gas turbine shown in FIG. 20.

Therefore, in this embodiment having a pilot nozzle 60 as a fuel supply means in the center of a burner, when increasing the number of burner to be supplied fuel, jet fuel from the pilot nozzle 60 (mode 4'). In FIG. 24, ● in double circle means that pilot nozzle 60 also supply fuel.

Thus, to operate in mode 4' between mode 3 and mode 4 enables lower limit of fuel air ratio to lower from lower limit 71 to lower limit 72 as shown in FIG. 24; the lower limit means the limit, below which gas turbine can not be operated because of blow off or large amount of unburned mixture. Therefore, compared to fuel supply line switch condition shown in FIG. 23, it is possible to switch from mode 3 to the next mode at lower load condition as shown in FIG. 24; the next mode is mode 4' to supply fuel to all the burners and pilot nozzle.

The switch of fuel line from mode 4' to mode 4 can be operated successively with flames on every burner, and the fuel flow rate of each line does not fluctuate. Therefore, not only mode 4 but also mode 4' can be included in operation load range, and operation load range can be broadened. In addition, all combustion is premix combustion, so NOx emission can be much lower, and a combustor with a structure that improve both low NOx emission and combustion stability can be supply.

Embodiment 7

Figure 25:
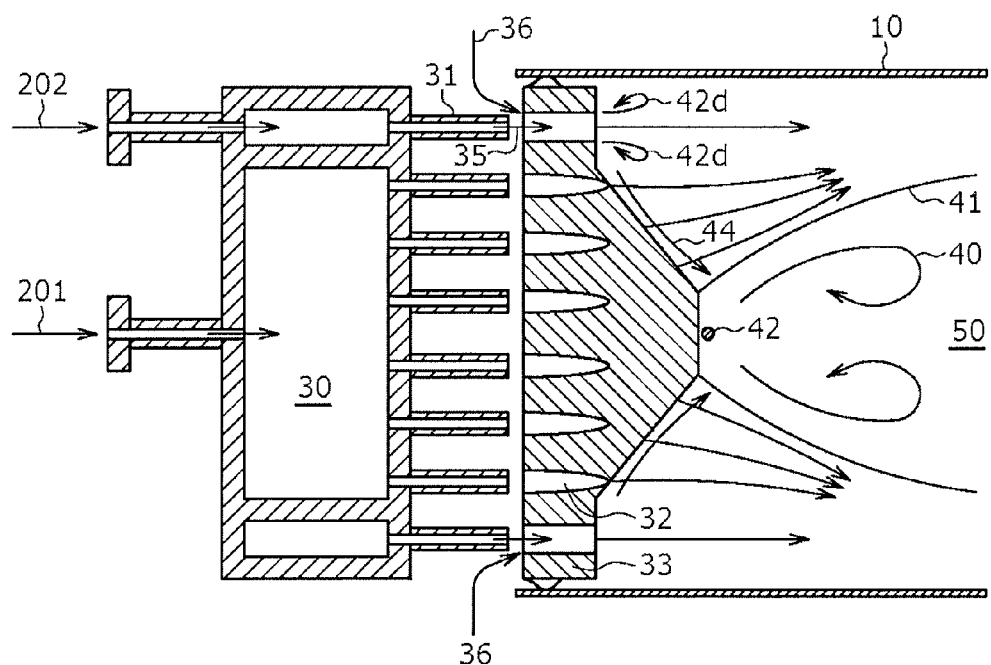
FIG. 25 illustrates a partial structure figure, which shows a details of a disposition of an air hole plate and a fuel nozzle header, which constitute a fuel supply part, for a gas turbine of a seventh embodiment.
Figure 26:
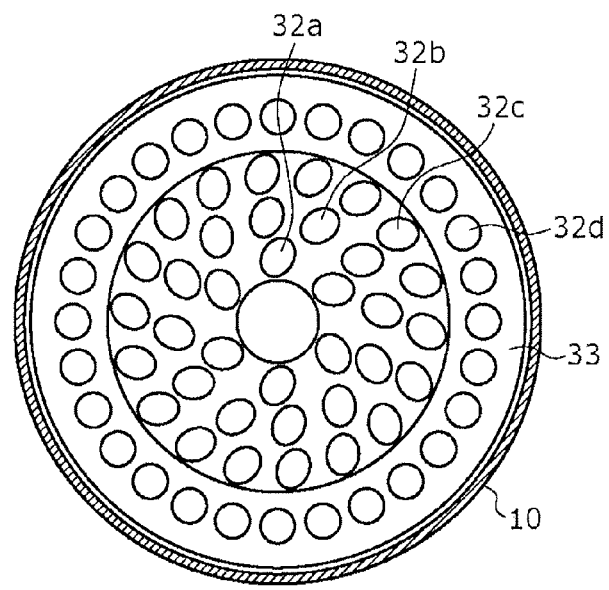
FIG. 26 illustrates a front view from a chamber, for the air hole plate of a seventh embodiment as shown in FIG. 20.

A seventh embodiment is shown in FIG. 25 and FIG. 26. FIG. 25 is a rough cross-section of the enlarged vicinity portion of fuel nozzles 31 and air holes 32, and FIG. 26 is a front view of a air hole plate 33 from a chamber 50 side.

In this embodiment, four circles of air holes are arranged as concentric circles in an air hole plate 33. Respective air hole circles are first circle air holes 32a, second circle air holes 32b, third circle air holes 32c, and fourth circle air holes 32d, from the center to outer peripheral side. In this embodiment, exits of first, second, and third circle air holes 32a, 32b, 32c are located in a connecting wall face that connects inner peripheral wall face and outer peripheral wall face of air hole plate 33. That is to say, fourth circle air holes 32d are different from air holes 32a, 32b, 32c located in connecting portion.

Connecting wall face is slanted to make chamber-downstream side closer than upstream side in radial distance from burner axis to connecting wall face.

On the other hand, exits of forth air holes 32d are located on outer peripheral wall face that is perpendicular to burner axis. Therefore in the vicinity of exits of air holes 32d, stagnation region 42d is generated and balancing point between combustion speed and mixed gas flow speed. But, flame generated position is apart from stagnation region 42, heat is not supplied to the balancing region between combustion speed and premix gas, stable flame is never formed in the stagnation region 42, sufficient distance to flame 41 lets fuel and air jetted from fourth circle air hole 32d mix well before combustion.

As for large burner, if locate all exits of air holes in slanted face, central portion of burner gets thick and causes a increase of cost. Therefore, to introduce this embodiment to large burner enables to restrain thickness of central portion of burner and increase of manufacturing cost.

In this embodiment, only fourth fuel nozzles 31d have other fuel line. Controlling the supply of fuel corresponding to combustion load improves both combustion stability and low NOx. Fuel line can be one in order to cut cost.

Embodiment 8

Figure 27:
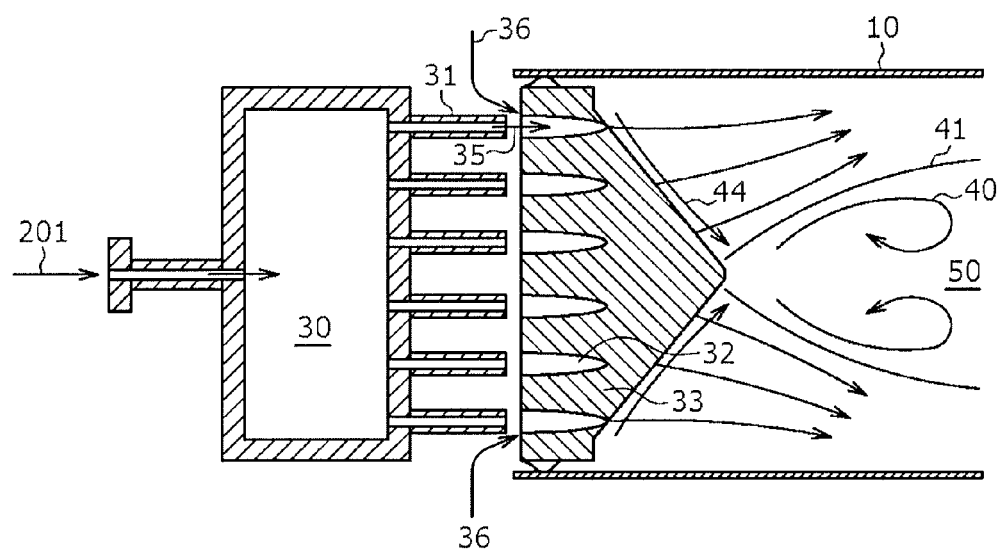
FIG. 27 illustrates a partial structure figure, which shows a details of a disposition of an air hole plate and a fuel nozzle header, which constitute a fuel supply part, for a gas turbine of an eighth embodiment.
Figure 28:
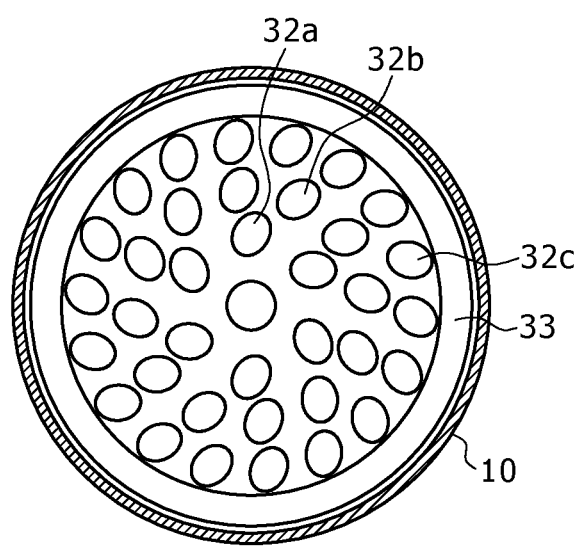
FIG. 28 illustrates a front view from a chamber, for the air hole plate of a eighth embodiment as shown in FIG. 27.

An eighth embodiment is shown in FIG. 27 and FIG. 28. FIG. 27 is a rough cross section of the enlarged vicinity portion of fuel nozzles 31 and air holes 32, and FIG. 21 is a front view of a air hole plate 33 from a chamber 50 side. In this embodiment, skip the explanation of the portion same as FIG. 5. In this embodiment, slanted face of air hole plate 33 extends to the vicinity of burner axis, and air hole plate has frusto-conical shape. Therefore the area of stagnation region 42 is very small, and recirculation flow 40 is also small.

This embodiment is suitable for fuel that contains hydrogen such as coal gasification gas. Hydrogen containing fuel has high combustion speed and high combustion stability. On the other hand, flame is easy to approach the air hole plate. Therefore as shown in FIG. 27, to narrow recirculation region and to make the distance long from first circle air holes 32*a* prevent from forming stable flame in the vicinity of air hole exits, and long distance is gain for jet of fuel and air before reach flame. In that way mixture is accelerated and NOx emission can be reduced. Even if recirculation region is small, high combustion speed let the combustion stable.

Not only for hydrogen containing fuel, but also high entrance temperature gas turbine for high efficiency, flame temperature rises and combustion speed gets faster, this embodiment is efficient.

This invention is suitable not only for power generating gas turbine combustor but also cogeneration system which can supply both heat and power, and mechanical driving gas turbine which drives pump or compressor, or various types of combustors.

1 compressor
2 combustor
3 turbine
4 casing
6 burner
10 combustor liner
11 flow sleeve
12 transition piece
13 flow sleeve surrounding the transition piece
20 power generator
21 shaft
30 fuel nozzle header
31 fuel nozzle
32 air hole
33 air hole plate
35 fuel jet
36 air jet
40 recirculation flow
41 flame
42 stagnation region
43 connecting portion
44 flow
50 chamber
51 inner peripheral coaxial jet nozzle group
52 outer peripheral coaxial jet nozzle group
60 pilot nozzle
70 operation example
71, 72 lower limit
100 atmospheric air
101 high pressure air
102 high temperature combustion air
200 fuel
201 F1 fuel
202 F2 fuel
211, 212 fuel control valve
1000 gas turbine plant

The invention claimed is:
1. A combustor comprising:
a chamber into which fuel and air is supplied;
an air hole plate located upstream of the chamber and having a plurality of air holes; and
a plurality of fuel nozzles to supply fuel to the air holes, wherein:
a center of a chamber-side face of the air hole plate extends further into the chamber than an exit of one of the plurality of the air holes located at an outermost peripheral region of the air plate;
the combustor further comprising:
an inner peripheral flat face on the chamber-side face of the air hole plate;
an outer peripheral flat face on the chamber-side face of the air hole plate located upstream of the inner peripheral flat face; and
a connecting portion which connects the inner peripheral flat face and the outer peripheral flat face,
wherein a wall face of the connecting portion is slanted in order to make a radial distance from a center axis of the air hole plate to the wall face in a downstream side closer than that in an upstream side; and
exits of the plurality of air holes located at an innermost peripheral region are disposed further downstream of the chamber than exits of the plurality of air holes located at the outermost peripheral region.

2. The combustor according to claim 1, wherein each air hole corresponds to a respective fuel nozzle.

3. The combustor according to claim 1, wherein the air holes are arranged in a plurality of concentric circles.

4. The combustor according to claim 1, wherein the air holes are slanted with respect to the central axis of the air hole plate.

5. The combustor according to claim 1, wherein the fuel nozzles are located upstream of the air hole plate.

6. The combustor according to claim 1, wherein the chamber-side face of the air hole plate forms a part of a wall of the chamber.

7. The combustor according to claim 1, wherein:
any first point on the chamber-side face of the air hole plate located upstream of any second point on the chamber-side face of the air hole plate is further from the central axis than the second point.

8. The combustor according to claim 1, wherein:
any point on the chamber-side face of the air hole plate whose distance from the central axis is less than the distance from the central axis for any other point extends the same distance or further into the chamber than the other point.

9. The combustor according to claim 1, wherein:
any point on the chamber-side face located further from the central axis than any other point is closer to the fuel-nozzle face than the other point.

10. The combustor according to claim 1 wherein:
the air hole plate further comprises flame holding means to stabilize a flame in the vicinity of the axis of the air hole plate.

11. The combustor according to claim 10 wherein:
the flame holding means is configured to promote a stagnation.

12. The combustor according to claim 4 further comprising:
a fuel supply means at the center of the chamber-side face of the air hole plate.

13. The combustor according to claim 3 wherein:
the air hole located at an innermost peripheral region is disposed on the connecting portion.

14. The combustor according to claim 7 wherein:
all the air holes are disposed at the connecting portion.

15. The combustor according to claim 3 wherein outer peripheral air holes are located on the outer peripheral flat face.

16. The combustor according to claim 1 wherein:
a distance between the chamber-side face of the air hole plate and a fuel nozzle side face of the air hole plate is constant in an axial direction of the air hole plate.

17. An operating method of operating a combustor that includes:
a chamber into which fuel and air is supplied;
an air hole plate located upstream of the chamber and having a plurality of air holes; and
a plurality of fuel nozzles to supply fuel to the air holes,
wherein a center of a chamber-side face of the air hole plate extends further into the chamber than an exit of one of the plurality of the air holes located at an outermost peripheral region of the air hole plate,
the combustor further comprising:
an inner peripheral flat face on the chamber-side face of the air hole plate;
an outer peripheral flat face on the chamber-side face of the air hole plate located upstream of the inner peripheral flat face; and
a connecting portion which connects the inner peripheral flat face and the outer peripheral flat face,
wherein a wall face of the connecting portion is slanted in order to make a radial distance from a center axis of the air hole plate to the wall face in a downstream side closer than that in an upstream side; and
exits of the plurality of air holes located at an innermost peripheral region are disposed further downstream of the chamber than exits of the plurality of air holes located at the outermost peripheral region,
the method comprising the steps of:
forming a recirculation flow downstream of the center of the chamber-side face of the air hole plate; and
generating a flow, which flows from an outer peripheral region to an inner peripheral region on the chamber-side face of the air hole plate by an entrainment of the recirculation flow.

18. The operating method of a combustor that includes:
a chamber into which fuel and air is supplied;
an air hole plate located upstream of the chamber and having a plurality of air holes; and
a plurality of fuel nozzles to supply fuel to the air holes, wherein:
a center of a chamber-side face of the air hole plate extends further into the chamber than an exit of one of the plurality of the air holes located at an outermost peripheral region of the air hole plate,
the combustor further comprising:
an inner peripheral flat face on the chamber-side face of the air hole plate;
an outer peripheral flat face on the chamber-side face of the air hole plate located upstream of the inner peripheral flat face; and
a connecting portion which connects the inner peripheral flat face and the outer peripheral flat face,
wherein a wall face of the connecting portion is slanted in order to make a radial distance from a center axis of the air hole plate to the wall face in a downstream side closer than that in an upstream side; and
exits of the plurality of air holes located at an innermost peripheral region are disposed further downstream of the chamber than exits of the plurality of air holes located at the outermost peripheral region,
the air hole plate further comprising:
flame holding means to stabilize a flame in the vicinity of the axis of the air hole plate,
wherein a portion of the air holes forms a first circle of air holes located on the air hole plate;
another portion of the air holes forms a second circle of air holes located at the outer peripheral region of the first circle of air holes on the air hole plate;
a portion of the fuel nozzles forms a first circle of fuel nozzles supplying fuel to the first circle of air holes; and
another portion of the fuel nozzles forms a second circle of fuel nozzles supplying fuel to the second circle of air holes,
further comprising the steps of:
supplying more fuel to the first circle of fuel nozzles than the second circle of fuel nozzles in fuel flow rate per one nozzle.

19. An operating method for a combustor, the combustor comprising:
a chamber into which fuel and air is supplied; and
a plurality of burners, each burner comprising:
a plurality of fuel nozzles to supply fuel to air holes;
an air hole plate located upstream of the chamber and having a plurality of the air holes, wherein a center of a chamber-side face of the air hole plate is located at further into the chamber than an exit of the air hole located at the outermost peripheral region; and
a fuel supply means at the center of the chamber-side face of the air hole plate,
the combustor further comprising:
an inner peripheral flat face on the chamber-side face of the air hole plate,
an outer peripheral flat face on the chamber-side face of the air hole plate located upstream of the inner peripheral flat face; and
a connecting portion which connects the inner peripheral flat face and the outer peripheral flat face,
wherein a wall face of the connecting portion is slanted in order to make a radial distance from a center axis of the air hole plate to the wall face in a downstream side closer than that in upstream side; and
exits of the plurality of air holes located at an innermost peripheral region are disposed further downstream of the chamber than exits of the plurality of air holes located at the outermost peripheral region,
the method comprising the step of:
starting the operation of the burner with fuel supplied by the fuel supply means of the burner.

* * * * *